US010549780B2

(12) United States Patent
Watanabe et al.

(10) Patent No.: US 10,549,780 B2
(45) Date of Patent: Feb. 4, 2020

(54) DRIVING ASSISTANCE DEVICE FOR A VEHICLE

(71) Applicant: TOYOTA JIDOSHA KABUSHIKI KAISHA, Toyota-shi, Aichi-ken (JP)

(72) Inventors: Masaya Watanabe, Miyoshi (JP); Yoshinori Yamada, Nagakute (JP); Chikashi Takeichi, Miyoshi (JP); Satoshi Arikura, Niwa-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 15/668,222

(22) Filed: Aug. 3, 2017

(65) Prior Publication Data
US 2018/0065664 A1 Mar. 8, 2018

(30) Foreign Application Priority Data

Sep. 8, 2016 (JP) .................. 2016-175721

(51) Int. Cl.
*B62D 15/02* (2006.01)
*B60W 10/20* (2006.01)
*G05D 1/02* (2006.01)

(52) U.S. Cl.
CPC ......... *B62D 15/0255* (2013.01); *B60W 10/20* (2013.01); *B62D 15/025* (2013.01); *B62D 15/0265* (2013.01); *G05D 1/0212* (2013.01); *B60W 2750/30* (2013.01)

(58) Field of Classification Search
CPC . B60W 10/20; B60W 2750/30; B62D 15/025; B62D 15/0265; B62D 15/0255; G05D 1/0212

USPC ........................................................ 701/26
See application file for complete search history.

(56) References Cited

U.S. PATENT DOCUMENTS

| 9,950,568 | B2* | 4/2018 | Edgren .................... G08B 6/00 |
| 2012/0253629 | A1 | 10/2012 | Maruyama | |
| 2013/0110343 | A1 | 5/2013 | Ichikawa et al. | |
| 2015/0166062 | A1* | 6/2015 | Johnson ................ B60W 30/12 |
| | | | 701/41 |
| 2016/0091896 | A1 | 3/2016 | Maruyama | |

(Continued)

FOREIGN PATENT DOCUMENTS

| DE | 102009008142 A1 | 8/2010 |
| DE | 102010022620 A1 | 12/2011 |
| JP | H11-99851 A | 4/1999 |

(Continued)

*Primary Examiner* — Anthony R Jimenez
(74) *Attorney, Agent, or Firm* — Oliff PLC

(57) ABSTRACT

A driving assistance device for a vehicle, comprising: a detection unit that detects a vicinity condition of the vehicle and a running condition of the vehicle; a driving control unit that, on the basis of detection results from the detection unit, controls at least a portion of driving operations of the vehicle and controls autonomous driving that is capable of an overtaking maneuver to overtake a vehicle in front; an operation unit that implements an operation to change a specified speed during the autonomous driving; and a control unit that, after the operation to change the specified speed is implemented by the operation unit in a state during autonomous driving in which a vehicle in front is detected by the detection unit, controls the driving control unit so as to carry out the overtaking maneuver.

9 Claims, 4 Drawing Sheets

(56) References Cited

U.S. PATENT DOCUMENTS

2016/0170410 A1    6/2016   Ichikawa et al.

FOREIGN PATENT DOCUMENTS

| JP | 2002-114055 A | 4/2002 | | |
|---|---|---|---|---|
| JP | 2003-063273 A | 3/2003 | | |
| JP | 2008-024122 A | 2/2008 | | |
| JP | 2011-162132 A | 8/2011 | | |
| JP | 2012-206700 A | 10/2012 | | |
| JP | 5382218 B2 | 1/2014 | | |
| JP | 2015-011458 A | 1/2015 | | |
| JP | 2016-002894 A | 1/2016 | | |
| JP | 2016-002895 A | 1/2016 | | |
| JP | 5910904 B1 | 4/2016 | | |
| JP | 2016-071513 A | 5/2016 | | |
| WO | 2015/176723 A1 | 11/2015 | | |
| WO | WO-2016109829 A1 * | 7/2016 | ............ | B60W 50/14 |

* cited by examiner

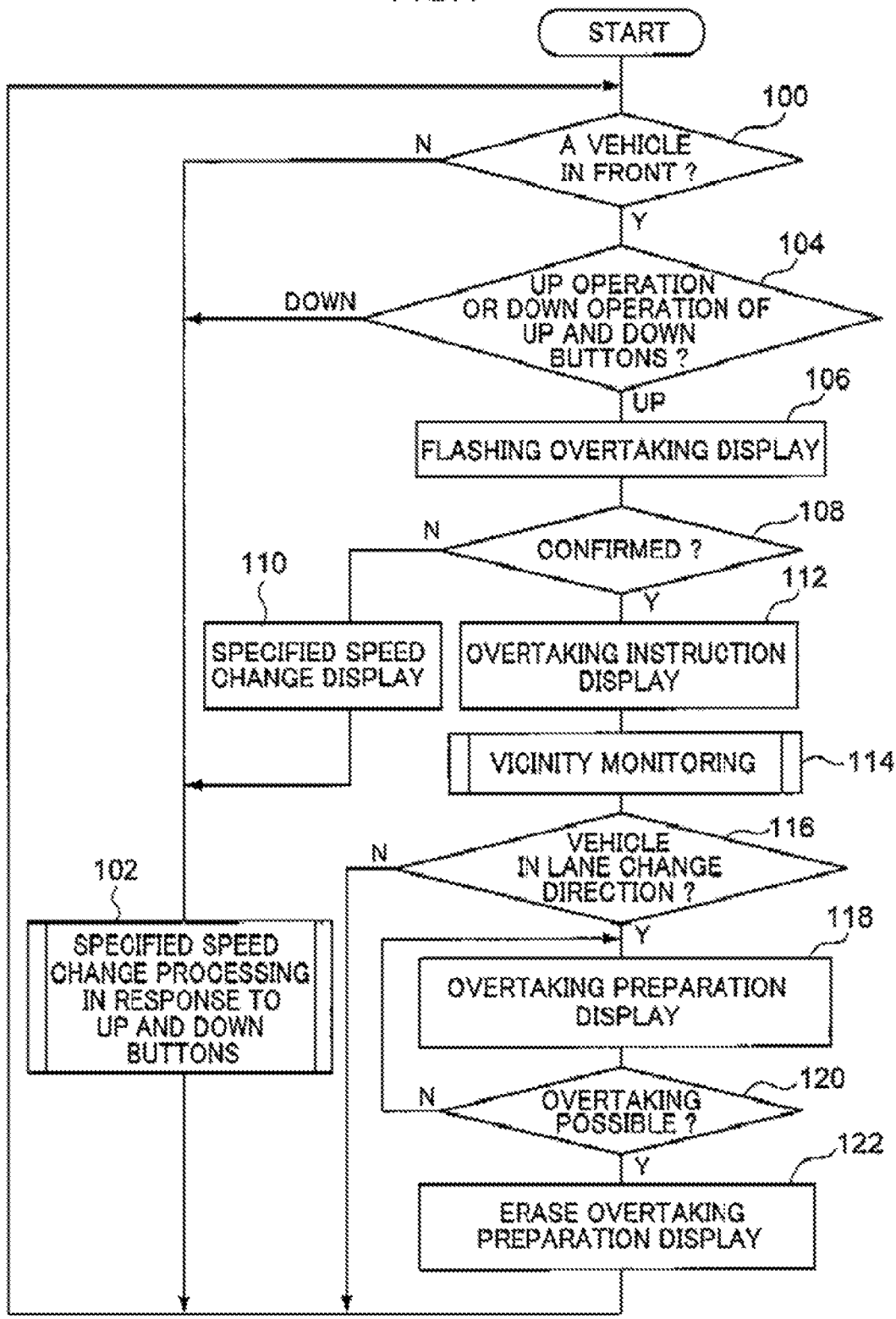

DRIVING ASSISTANCE DEVICE FOR A VEHICLE

CROSS-REFERENCE TO RELATED APPLICATION

This application is based on and claims priority under 35 USC 119 from Japanese Patent Application No. 2016-175721 filed on Sep. 8, 2016, the disclosure of which is incorporated by reference herein.

BACKGROUND

Technical Field

The present disclosure relates to a driving assistance device for a vehicle.

Related Art

Autonomous driving technologies that conduct some or all driving of a vehicle autonomously have been developed in recent years.

For example, Japanese Patent Application Laid-Open (JP-A) No. 2016-071513 proposes a driving support control device that is equipped with a lane change opportunity determination unit, a driver intention determination unit, and a lane change control unit.

During autonomous driving operations, in which acceleration/deceleration and steering of a vehicle can be controlled autonomously, the lane change opportunity determination unit makes determinations of predetermined conditions and determines when an opportunity in which a change of driving lane is possible arises. When it is determined that a lane change is possible, the lane change opportunity determination unit performs control to present a lane change proposal to a driver. The driver intention determination unit determines an intention of the driver with regard to the lane change proposal. In response to a determination by the driver intention determination unit that the driver agrees with the lane change proposal, the lane change control unit controls acceleration/deceleration and steering of the vehicle to implement the lane change autonomously. When the driver intention determination unit determines that the intention of the driver is disagreement with the lane change proposal, the lane change opportunity determination unit does not perform control to present any lane change proposal to the driver until a predetermined cancellation condition is satisfied.

JP-A No. 2016-071513 recites that when a driver thinks that a lane change for overtaking is desirable, it is sufficient for the driver to perform a lane change request operation. However, a button or the like is required in order to perform this lane change request operation. Providing an additional operation portion such as a button or the like for a driver to instruct overtaking is not preferable in regard to space for arrangement, ease of operations and the like.

SUMMARY

The present disclosure has been devised in consideration of the circumstances described above and an object of the present disclosure is to provide a driving assistance device for a vehicle with which overtaking may be instructed without a number of operation portions being increased.

In order to achieve the object described above, a first aspect includes: a detection unit that detects a vicinity condition of the vehicle and a running condition of the vehicle; a driving control unit that, on the basis of detection results from the detection unit, controls at least a portion of driving operations of the vehicle and controls autonomous driving that is capable of an overtaking maneuver to overtake a vehicle in front; an operation unit that implements an operation to change a specified speed during the autonomous driving; and a control unit that, after the operation to change the specified speed is implemented by the operation unit in a state during autonomous driving in which a vehicle in front is detected by the detection unit, controls the driving control unit so as to carry out the overtaking maneuver.

According to the first aspect, vicinity conditions of the vehicle and running conditions of the vehicle are detected by the detection unit. The driving control unit controls at least a portion of driving operations of the vehicle on the basis of detection results from the detection unit, and controls the autonomous driving that is capable of an overtaking maneuver to overtake a vehicle in front. Thus, the vehicle in front may be overtaken by the autonomous driving. A specified speed of the autonomous driving may be changed by an operation of the operation unit.

In a state in which a vehicle in front has been detected by the detection unit during autonomous driving, the control unit controls the driving control unit so as to perform the overtaking maneuver when the operation that changes the specified speed is performed with the operation unit. That is, in the state in which a vehicle in front has been detected by the detection unit during autonomous driving, an overtaking instruction may be given by the same operation as the operation to change the specified speed. Therefore, the overtaking instruction may be given without a number of operation portions being increased in order to realize the overtaking instruction.

In a second aspect, a display unit may be further provided that, before the overtaking maneuver is performed, displays information indicating that an overtaking instruction has been given. Therefore, it is possible to confirm that the operation to instruct overtaking has been performed through the display unit. Thus, an overtaking maneuver that is not what the driver intended, due to mis-operation, may be prevented.

In a third aspect, after a state in which overtaking is not possible is detected by the detection unit, the driving control unit may control the autonomous driving so as to wait until overtaking is possible. Because driving may be conducted in accordance with conditions of preceding vehicles, such as a lane change by a preceding vehicle or the like, circumstances in which the driver feels disconcerted may be reduced.

In a fourth aspect, a display unit may be further provided that displays an overtaking display and a speed change display in a same screen, as information relating to operations of the operation unit. Therefore, it can be easily understood that an overtaking instruction or a specified speed change instruction may be selected.

In a fifth aspect, the operation to change the specified speed may be an operation to raise the specified speed. Therefore, because the operation to instruct overtaking may be the same operation as the operation to raise the specified speed, an overtaking instruction may be given by an intuitive, easily understood instruction.

According to the present disclosure as described above, there is an excellent effect in that a driving assistance device for a vehicle may be provided with which overtaking may be instructed without a number of operation portions being increased.

BRIEF DESCRIPTION OF THE DRAWINGS

Exemplary embodiments of the present disclosure will be described in detail based on the following figures, wherein:

FIG. 4 is a flowchart showing an example of a flow of processing that is executed by an autonomous driving control ECU of the driving assistance device for a vehicle according to the present exemplary embodiment.

DETAILED DESCRIPTION

Figure 1:
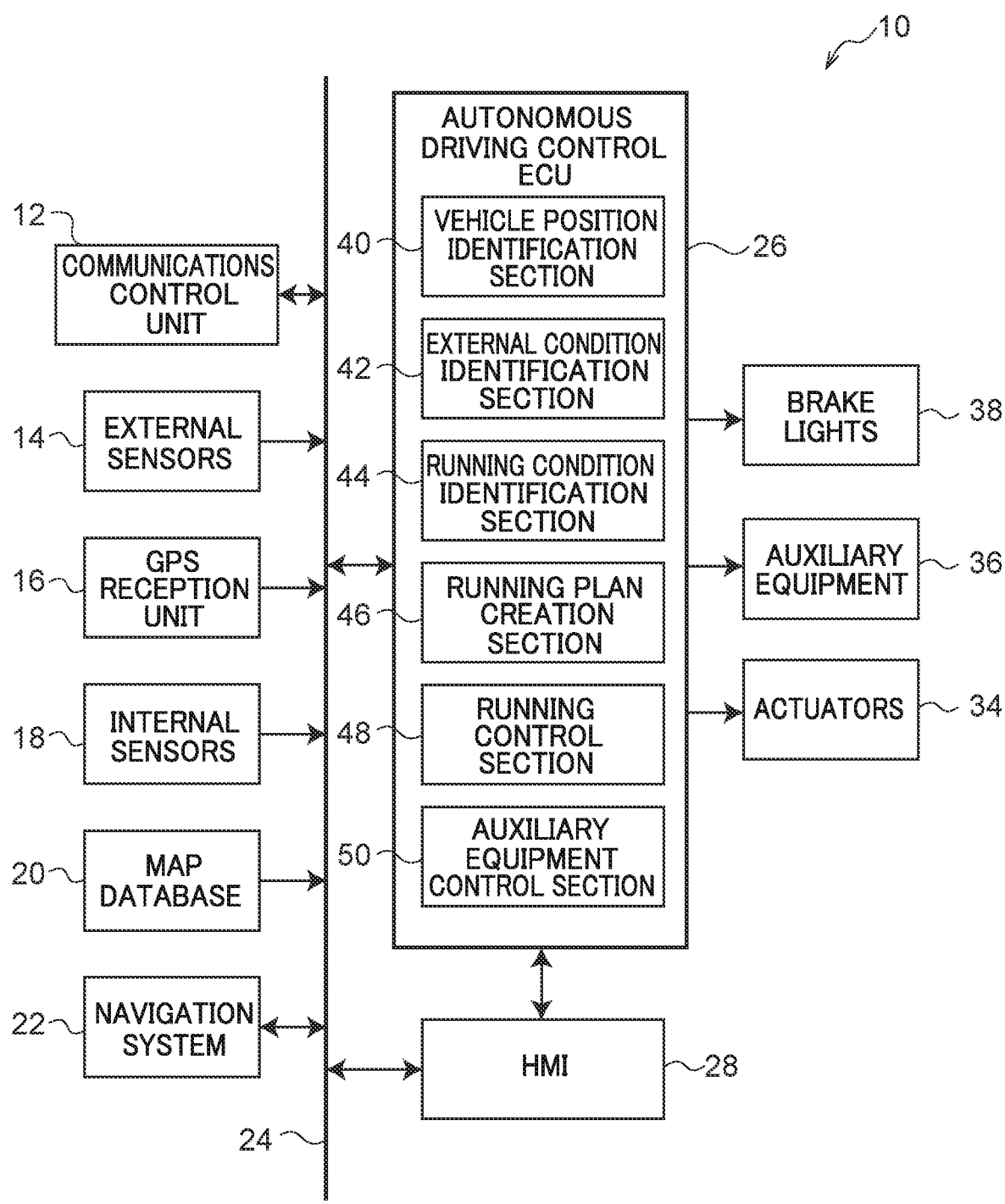
FIG. 1 is a block diagram showing a configuration of a driving assistance device for a vehicle according to a present exemplary embodiment.

Herebelow, an example of an exemplary embodiment of the present disclosure is described in detail with reference to the attached drawings. FIG. 1 is a block diagram showing a configuration of the driving assistance device for a vehicle according to the present exemplary embodiment. Below, a driving assistance device for a vehicle that is capable of monitoring the vehicle vicinity and running to a target destination by autonomous driving is described as an example.

A driving assistance device for a vehicle 10 includes a communications control unit 12, external sensors 14, a global positioning system (GPS) reception unit 16, internal sensors 18, a map database 20 and a navigation system 22. The communications control unit 12, external sensors 14, GPS reception unit 16, internal sensors 18, map database 20 and navigation system 22 are respectively connected to an on-board network 24 such as a controller area network (CAN) or the like. An autonomous driving control electronic control unit (ECU) 26 and a human machine interface (HMI) 28 are also respectively connected to the on-board network 24. The autonomous driving control ECU 26 corresponds to examples of a driving control unit and a control unit, and the HMI 28 corresponds to examples of an operation unit and a display unit.

The communications control unit 12 acquires vicinity information of the vehicle and the like between the vehicle and the exterior of the vehicle. For example. the communications control unit 12 communicates with infrastructure provided on the roads (for example, optical beacons and the like) and receives vicinity information such as traffic information and the like. The communications control unit 12 communicates with an external server or the like in the cloud or suchlike via a network such as a mobile telephone communications network or the like. The communications control unit 12 is capable of sending information such as acquired vicinity information and the like to equipment that is connected to the on-board network 24.

The external sensors 14 detect vicinity conditions of the vehicle. The external sensors 14 include at least one of a camera, a radar and a LIDER (laser imaging detection and radiation). For example, a camera is provided inside the cabin at an upper portion of a front glass of the vehicle and acquires image information by imaging external conditions of the vehicle. The camera is capable of sending acquired image information to equipment that is connected to the on-board network 24. The camera may be a single lens camera and may be a stereo camera. In the case of a stereo camera, the camera includes two imaging units disposed so as to reproduce binocular parallax. Depth direction information is included in the image information from a stereo camera. A radar transmits electromagnetic waves (for example, millimeter waves) to the vicinity of the vehicle, detects obstacles by receiving electromagnetic waves reflected by the obstacles, and is capable of sending detected obstacle information to equipment that is connected to the on-board network 24. A LIDER transmits light to the vicinity of the vehicle, measures distances to reflection points by receiving light reflected by obstacles, and thus detects the obstacles. The LIDER is capable of sending detected obstacle information to equipment that is connected to the on-board network 24. A camera, a LIDER and a radar are not necessarily equipped in combination.

The GPS reception unit 16 measures a position of the vehicle (for example, the latitude and longitude of the vehicle) by receiving signals from three or more GPS satellites. The GPS reception unit 16 is capable of sending the measured position information of the vehicle to equipment that is connected to the on-board network 24. Alternative means capable of determining the latitude and longitude of the vehicle may be employed instead of the GPS reception unit 16. In order to check measurement results of the sensors against map information, which is described below, it is also preferable to provide a function that measures the orientation of the vehicle.

The internal sensors 18 detect vehicle conditions such as running states and the like by detecting physical quantities during running of the vehicle. The internal sensors 18 include at least one of, for example, a vehicle speed sensor, an acceleration sensor and a yaw rate sensor. For example, a vehicle speed sensor is provided at a wheel of the vehicle, a hub that turns integrally with the wheel, a rotor, a driveshaft or the like, and detects a vehicle speed by detecting a rotation speed of the wheels. The vehicle speed sensor is capable of sending detected vehicle speed information (wheel speed information) to equipment that is connected to the on-board network 24. The acceleration sensor detects accelerations and decelerations of the vehicle and detects accelerations caused by turning, collisions and the like. The acceleration sensor includes, for example, a front-and-rear acceleration sensor that detects accelerations of the vehicle in the front-and-rear direction, a lateral acceleration sensor that detects lateral accelerations in the left-and-right direction of the vehicle (the vehicle width direction), and a vertical acceleration sensor that detects accelerations in the vertical direction of the vehicle. The acceleration sensor is capable of sending acceleration information of the vehicle to equipment that is connected to the on-board network 24. The yaw rate sensor detects a yaw rate (turning angular velocity) about a vertical axis at the center of gravity of the vehicle. For example, a gyro sensor may be employed as the yaw rate sensor. The yaw rate sensor is capable of sending detected yaw rate information to equipment that is connected to the on-board network 24.

The map database 20 is a database provided with map information. The map database 20 is memorized in, for example, a hard disk drive (HDD) mounted in the vehicle. The map information includes, for example, position information of roads, information on road shape (for example curves, types of linear sections, curvature of curves and the like), and position information of intersections and branches. The map information may also include position information of shading structures such as buildings, walls and the like and, for the use of simultaneous localization and mapping (SLAM) technology, signals outputted from the external sensors 14. Further, the map database 20 may be memorized in a computer at a facility such as a information processing center or the like that is capable of communicating with the vehicle.

The navigation system 22 guides a driver of the vehicle to a destination specified by the driver of the vehicle. The navigation system 22 calculates a route for the vehicle to run along on the basis of position information of the vehicle measured by the GPS reception unit 16 and the map information in the map database 20. For sections with multiple driving lanes, the route may specify preferred lanes. For example, the navigation system 22 computes a target route to the destination from the position of the vehicle, and informs vehicle occupants of the target route by displays at a display and voice outputs from a speaker. The navigation system 22 is capable of sending information of the target route of the vehicle to equipment that is connected to the on-board network 24. Functions of the navigation system 22 may be stored in a computer at a facility such as a information processing center or the like that is capable of communicating with the vehicle.

The autonomous driving control ECU 26 is constituted by a microcomputer including a central processing unit (CPU), a read-only memory (ROM), a random access memory (RAM) and the like. Actuators 34, auxiliary equipment 36, brake lights 38 and the HMI 28 are connected to the autonomous driving control ECU 26.

The autonomous driving control ECU 26 loads a program memorized in advance in the ROM into the RAM and executes the program at the CPU. Thus, the autonomous driving control ECU 26 conducts autonomous driving by controlling operations of the actuators 34, the auxiliary equipment 36, the brake lights 38, the HMI 28 and so forth. The autonomous driving control ECU 26 may be constituted by plural electronic control units.

The actuators 34 are control objects during autonomous driving control of the vehicle. The autonomous driving control ECU 26 conducts running control of the vehicle by controlling operations of the actuators 34. To be specific, the actuators 34 include at least a throttle actuator, a brake actuator and a steering actuator. The throttle actuator controls a supply amount of air to the engine (a throttle opening) in accordance with commands from the autonomous driving control ECU 26 and thus controls driving power of the vehicle. If the vehicle is a hybrid vehicle or an electric car, the throttle actuator is not included but commands from the autonomous driving control ECU 26 are inputted to a motor that serves as a power source to control driving power. The brake actuator controls a braking system in accordance with commands from the autonomous driving control ECU 26. The brake actuator controls braking force applied to the wheels of the vehicle and controls lighting of the brake lights 38. As an example, a hydraulic braking system may be employed as the braking system. In accordance with commands from the autonomous driving control ECU 26, the steering actuator controls driving of an assistance motor that controls steering torque in an electric power steering system. Thus, the steering actuator controls steering torque of the vehicle. The auxiliary equipment 36 is equipment that may be operated by a driver of the vehicle at usual times. The auxiliary equipment 36 is a general term for equipment that is not included in the actuators 34. The auxiliary equipment 36 referred to herein includes, for example, turn signal lights, headlamps, windshield wipers and the like.

More specifically, the autonomous driving control ECU 26 includes a vehicle position identification section 40, an external condition identification section 42, a running condition identification section 44, a running plan creation section 46, a running control section 48 and an auxiliary equipment control section 50. The autonomous driving control ECU 26 creates a running plan along a pre-specified target route on the basis of vicinity information of the vehicle according to the above-mentioned components and the map information, and controls driving such that the vehicle runs independently in accordance with the created running plan.

The vehicle position identification section 40 identifies the position of the vehicle on a map (herebelow referred to as "the vehicle position") on the basis of the position information of the vehicle received by the GPS reception unit 16 and the map information in the map database 20. The vehicle position identification section 40 may acquire the vehicle position employed at the navigation system 22 from the navigation system 22 to identify the vehicle position. If the vehicle position can be measured by sensors disposed outside the vehicle on a road or the like, the vehicle position identification section 40 may acquire the vehicle position by communications with these sensors.

The external condition identification section 42 identifies external conditions of the vehicle on the basis of the vicinity information acquired by the communications control unit 12, and/or detection results from the external sensors 14 (for example, image information from a camera, obstacle information from a radar, obstacle information from a LIDER and the like), and the like. The external conditions include, for example, the positions of white lines of a driving lane relative to the vehicle, the position of the lane center, the road width, the road shape, conditions of obstacles in the vicinity of the vehicle, and so forth. The road shape may include, for example, curvatures of the driving lane, gradient changes and undulations of road surface which are useful to estimate forecast of the external sensors 14, and the like. Conditions of obstacles in the vicinity of the vehicle include, for example, information distinguishing fixed obstacles from moving obstacles, positions of the obstacles relative to the vehicle, movement directions of the obstacles relative to the vehicle, relative speeds of the obstacles relative to the vehicle, and so forth. Checking detection results of the external sensors 14 against the map information is excellent for supplementing accuracy of the position and direction of the vehicle acquired by the GPS reception unit 16 and the like.

The running condition identification section 44 identifies running conditions of the vehicle on the basis of detection results from the internal sensors 18 (for example, vehicle speed information from the vehicle speed sensor, acceleration information from the acceleration sensor, yaw rate information from the yaw rate sensor, and the like). The running conditions of the vehicle include, for example, the vehicle speed, acceleration and yaw rate.

The running plan creation section 46 creates a course for the vehicle on the basis of, for example, the target route computed by the navigation system 22, the vehicle position identified by the vehicle position identification section 40 and the external conditions of the vehicle identified by the external condition identification section 42 (including the vehicle position and orientation). The running plan creation section 46 creates a course along which the vehicle will proceed along the target route. The running plan creation section 46 creates the course such that the vehicle runs along the target route excellently in consideration of standards such as safety, compliance with laws, running efficiency and so forth. Of course, the running plan creation section 46 creates this course for the vehicle on the basis of the conditions of obstacles in the vicinity of the vehicle so as to avoid contact with the obstacles. Note that the meaning of the above term "target route" includes a running route that is autonomously created on the basis of external conditions, and/or map information and the like when a destination is not explicitly specified by a driver, so as to run along roads as in, for example, Japanese Patent No. 5,382,218 (WO 2011/158347) and JP-A No. 2011-162132. The running plan creation section 46 creates a running plan in accordance with the created course. That is, the running plan creation section 46 creates a running plan along the pre-specified target route at least on the basis of external conditions, which are vicinity information of the vehicle, and the map information in the map database 20. It is preferable if the running plan creation section 46 outputs the created running plan as a series in which the course of the vehicle is constituted by pairs of elements—target positions p in a coordinate system that is fixed for the vehicle and velocities v at respective target points—that is, as a plan containing plural configuration coordinates (p,v). Herein, the respective target positions p include at least x-coordinate and y-coordinate positions in the coordinate system fixed for the vehicle, or equivalent information. The running plan is not particularly limited provided it represents movements of the vehicle. The running plan may employ, for example, target times t instead of velocities v, and may attach orientations of the vehicle at those times to the target times t. Ordinarily, it is sufficient for a running plan to mainly be data for the next few seconds from the current moment. However, depending on situations, such as turning right at an intersection, overtaking another vehicle and the like, data for tens of seconds will be required. Therefore, it is preferable if a number of configuration coordinates in the running plan is variable and if distances between the configuration coordinates are variable. Further, a running plan may be formed of curve parameters in which curves joining the configuration coordinates are approximated by spline functions or the like. For the creation of a running plan, an arbitrary publicly known method may be employed, provided movements of the vehicle can be represented. Further yet, a running plan may be data that represents changes in vehicle speed, acceleration/deceleration, steering torque of the vehicle and the like when the vehicle is running along the course along the target route. The running plan may include speed patterns, acceleration/deceleration patterns and steering patterns of the vehicle. This running plan creation section 46 may create running plans such that a journey time (the required time needed for the vehicle to reach the destination) is minimized. Incidentally, the term "speed pattern" refers to, for example, data constituted of target vehicle speeds specified by associating target control positions specified at a predetermined interval (for example, 1 m) along the course with time for the respective target control positions. The term "acceleration/deceleration pattern" refers to, for example, data constituted of target acceleration/deceleration that are specified by associating time for the respective target control positions with the target control positions specified at the predetermined interval (for example, 1 m) along the course. The term "steering pattern" refers to, for example, data constituted of target steering torques that are specified by associating the time for the respective target control positions with the target control positions specified at the predetermined interval (for example, 1 m) along the course.

The running control section 48 autonomously controls running of the vehicle on the basis of the running plan created by the running plan creation section 46. The running control section 48 outputs control signals to the actuators 34 in accordance with the running plan. Thus, the running control section 48 controls driving of the vehicle such that the vehicle runs independently through the running plan. For independent running, when the running control section 48 is controlling the running of the vehicle, the running control section 48 controls the running of the vehicle in accordance with the running plan while monitoring identification results from the vehicle position identification section 40, the external condition identification section 42 and the running condition identification section 44.

The auxiliary equipment control section 50 combines signals outputted from the HMI 28 with the running plan created at the running plan creation section 46 and controls the auxiliary equipment 36.

Figure 2:
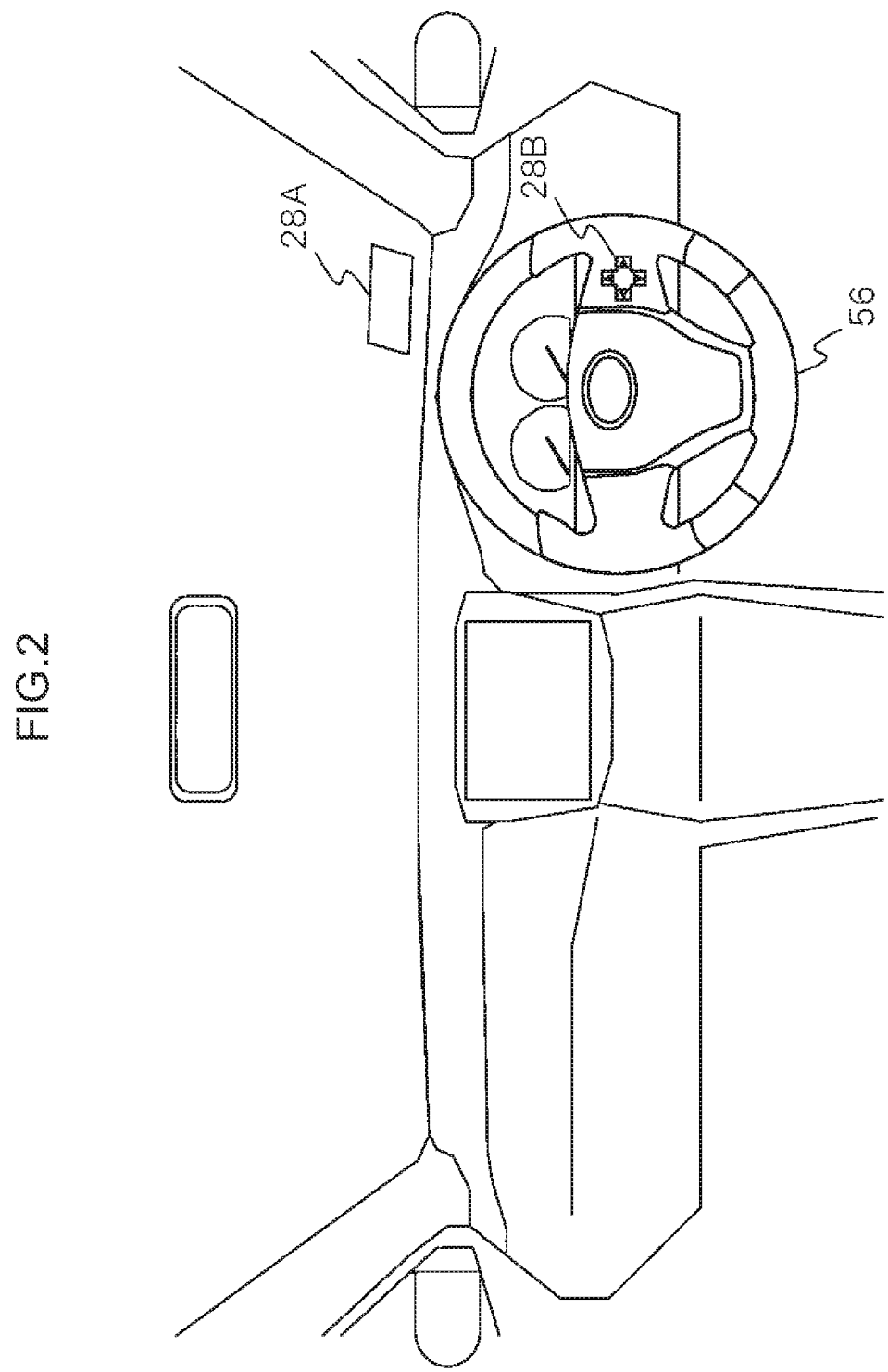
FIG. 2 is a view showing dispositions of a four-way control button and a head-up display.

The HMI 28 reports various kinds of information such as states of the vehicle and the like to a vehicle occupant and accepts inputs of information from the vehicle occupant. The HMI 28 includes, for example: buttons for operating turn signal lights, headlamps, windshield wipers and the like; buttons for switching relating to autonomous driving; a display that displays various kinds of information; an operation unit for operational inputs; and light-emitting devices, a speaker and the like for reporting various kinds of information. The buttons for switching relating to autonomous driving may command switching between autonomous driving and manual driving, command the termination of a switch from autonomous driving to manual driving, and so forth. More specifically, as shown in FIG. 2, the HMI 28 includes a four-way control button 28B provided at a steering wheel 56 and a head-up display 28A, at which a pre-specified region of the front windshield glass serves as a display region. In the present exemplary embodiment, operations including at least an overtaking instruction and a specified speed change during autonomous driving may be implemented by the four-way control button 28B, which serves as an example of an operation unit. Details of instructions according to operations of the four-way control button 28B are displayed at the head-up display 28A, which serves as an example of a display unit.

Figure 3:
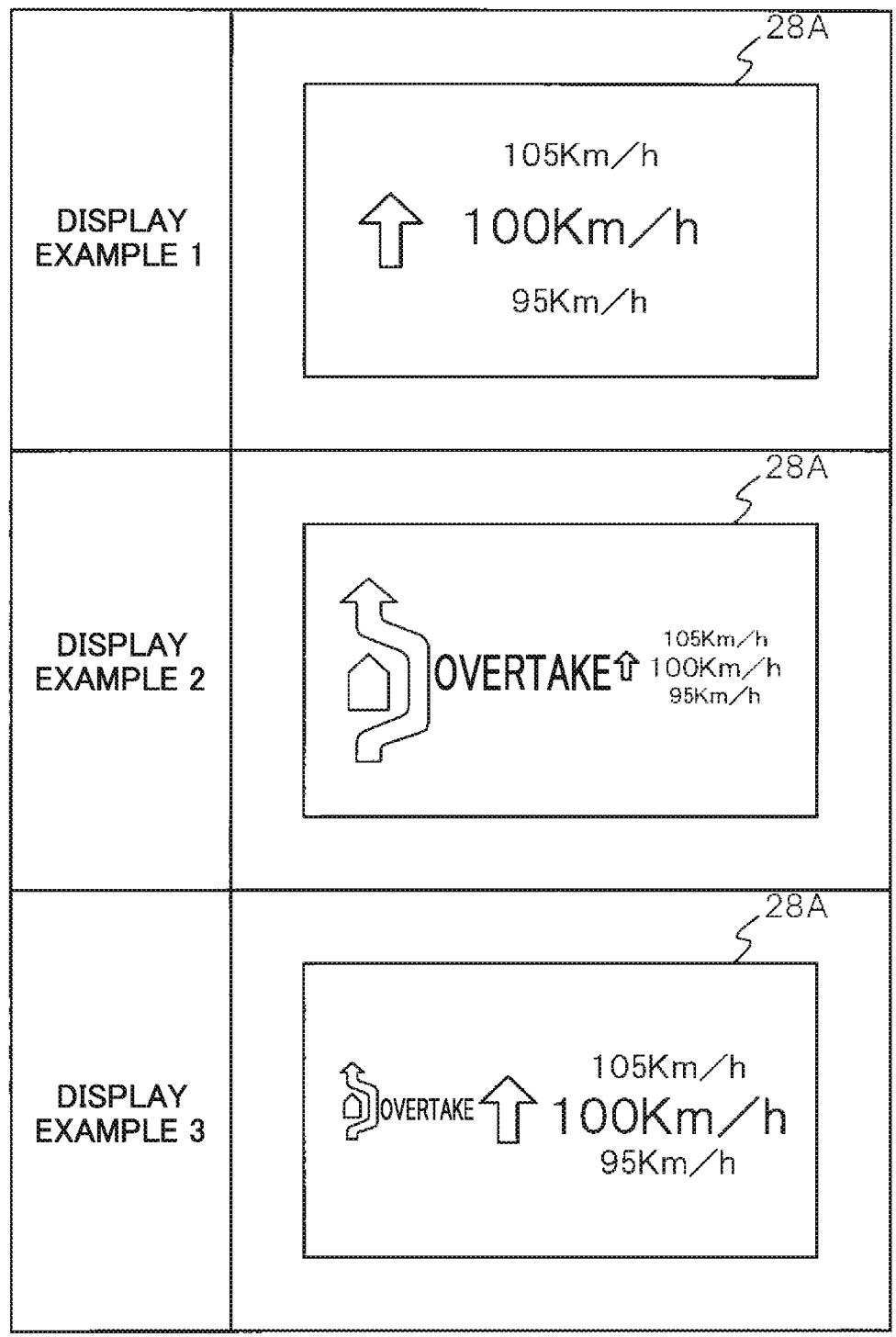
FIG. 3 is views showing display examples of the head-up display.

Now, details of instructions that can be performed by operation of the four-way control button 28B and display examples at the head-up display 28A are described. FIG. 3 is views showing display examples of the head-up display 28A.

Display example 1 is a display example for when an up or down button of the four-way control button 28B is operated when there is no other vehicle in front. If the four-way control button 28B is operated when there is no vehicle in front, a specified speed change screen is displayed at the head-up display 28A. Each time the up button of the four-way control button is operated, the specified speed is changed and displayed at the head-up display 28A.

Display example 2 is a display example for when the up or down button of the four-way control button 28B is operated when there is another vehicle in front. If the four-way control button 28B is operated when there is a vehicle in front, an overtaking instruction screen is displayed at the head-up display 28A in a flashing condition prior to confirmation. In addition, an alternative candidate is displayed smaller at the right side. Display example 2 illustrates an example in which the specified speed change screen is displayed smaller as the alternative candidate. If the up button of the four-way control button 28B is operated, the overtaking instruction is confirmed, the flashing stops, and the overtaking instruction screen is displayed at the head-up display 28A.

Display example 3 is a display example for when the alternative candidate has been selected in display example 2.

If the right button of the four-way control button 28B is operated in the state in display example 2, the specified speed change screen that was displayed smaller at the right side is displayed larger, and the overtaking instruction screen is displayed smaller at the left side, as an alternative candidate.

As an alternative to display example 1, when the specified speed change screen is displayed when there is no vehicle in front, an alternative candidate may be displayed smaller as shown in display example 3.

Now, for the driving assistance device for a vehicle 10 according to the present exemplary embodiment that is structured as described above, an example of processing relating to operation and display that is executed by the autonomous driving control ECU 26 when the four-way control button 28B is operated during autonomous driving is described. FIG. 4 is a flowchart showing an example of the flow of processing that is executed by the autonomous driving control ECU 26 of the driving assistance device for a vehicle according to the present exemplary embodiment. The processing in FIG. 4 starts when the four-way control button 28B is operated.

In step 100, the autonomous driving control ECU 26 makes a determination as to whether there is another vehicle in front. This determination is made by, for example, determining whether or not a vehicle in front is detected by the external sensors 14. If the result of the determination is negative, the autonomous driving control ECU 26 proceeds to step 102, and if the result is affirmative, the autonomous driving control ECU 26 proceeds to step 104.

In step 102, the autonomous driving control ECU 26 executes specified speed change processing in response to the up and down buttons, and then returns to step 100 and repeats the processing described above. In the specified speed change processing, as shown in display example 1 in FIG. 3, the specified speed change screen is displayed at the head-up display 28A. Hence, the specified speed is changed in accordance with operations of the up and down buttons of the four-way control button 28B, the specified speed is displayed at the head-up display 28A, and the specified speed is changed when a confirmation operation is performed.

In step 104, the autonomous driving control ECU 26 makes a determination as to whether the up button or the down button of the four-way control button 28B has been operated. If the down button of the four-way control button 28B is operated, the autonomous driving control ECU 26 proceeds to step 102, and if the up button is operated, the autonomous driving control ECU 26 proceeds to step 106.

In step 106, the autonomous driving control ECU 26 controls the head-up display 28A so as to display the overtaking instruction screen, flashing, and then proceeds to step 108. That is, if there is a vehicle in front when the four-way control button 28B is operated during autonomous driving, as shown in display example 2 in FIG. 3, the overtaking instruction screen is displayed in the flashing state prior to confirmation. Thus, the driver may recognize from the flashing display that the overtaking instruction has been performed, and an overtaking maneuver that is not what the driver intended, due to mis-operation, may be prevented. Moreover, because the specified speed change screen is displayed smaller as shown in FIG. 3, it can be easily understood that a specified speed change instruction may be selected.

In step 108, the autonomous driving control ECU 26 makes a determination as to whether the overtaking instruction has been confirmed. This determination is made by, for example, determining whether or not the up button of the four-way control button 28B has been operated as a confirmation operation. If the right button of the four-way control button 28B is operated, the result of the determination is negative and the autonomous driving control ECU 26 proceeds to step 110. If the result is affirmative, the autonomous driving control ECU 26 proceeds to step 112.

In step 110, the autonomous driving control ECU 26 controls the head-up display 28A so as to display the specified speed change screen, proceeds to step 102, and executes the specified speed change processing.

On the other hand, in step 112 the autonomous driving control ECU 26 controls the head-up display 28A so as to display the overtaking instruction screen, and proceeds to step 114. That is, the overtaking instruction screen is displayed as shown in display example 2 in FIG. 3.

In step 114, the autonomous driving control ECU 26 executes vicinity monitoring processing, and proceeds to step 116. That is, the autonomous driving control ECU 26 implements monitoring by the external sensors 14 of vehicles and the like in a lane change direction in order to carry out a lane change for overtaking. The vicinity monitoring processing may monitor vicinity conditions by, beside monitoring of vicinity conditions by the external sensors 14, road-to-vehicle communications, vehicle-to-vehicle communications and the like. Further, the autonomous driving control ECU 26 may monitor vicinity conditions on the basis of one or more of detection results from the external sensors 14, communication results from road-to-vehicle communications, and communication results of vehicle-to-vehicle communications. Various widely known technologies may be employed for road-to-vehicle communications and vehicle-to-vehicle communications. Therefore, details thereof are not described here.

In step 116, the autonomous driving control ECU 26 makes a determination as to whether there is a vehicle in the lane change direction. If the result of this determination is affirmative, the autonomous driving control ECU 26 proceeds to step 118, and if the result is negative, the autonomous driving control ECU 26 returns to step 100 and repeats the processing described above. Although not included in the processing shown in FIG. 4 because only parts of processing relating to operations and displays are shown, if the result of the determination in step 116 is negative, control is performed to carry out a lane change and carry out the overtaking maneuver.

In step 118, the autonomous driving control ECU 26 performs control such that an overtaking preparation display is displayed at the head-up display 28A, and proceeds to step 120.

In step 120, the autonomous driving control ECU 26 makes a determination as to whether overtaking is possible on the basis of detection results from the external sensors 14. If the result of this determination is affirmative, the autonomous driving control ECU 26 proceeds to step 122, and if the result is negative, the autonomous driving control ECU 26 returns to step 118 and continues to display the overtaking preparation display.

In step 122, the autonomous driving control ECU 26 erases the overtaking preparation display shown at the head-up display 28A, returns to step 100, and repeats the processing described above. That is, in a state in which overtaking is not possible, for example when there is a vehicle or such in the lane change direction or the like, the autonomous driving control ECU 26 waits to overtake even though the overtaking instruction has been given. Therefore, because driving is possible in accordance with conditions of preceding vehicles, such as a preceding vehicle changing lane or the like, circumstances in which the driver feels disconcerted may be reduced.

Thus, in the present exemplary embodiment, the operation for an overtaking instruction during autonomous driving may be performed by the same operation of the four-way control button 28B as the operation for a specified speed change. Thus, because the overtaking instruction operation during autonomous driving may be performed using the button for a specified speed change that is already present, space for arranging a button for the overtaking instruction is not required, and the number of buttons is not increased.

The overtaking instruction may be given by the up operation of the four-way control button 28B, which is the same operation as a speed-up operation of a specified speed change. Therefore, the operation may be performed more intuitively than with another button operation.

In the exemplary embodiment described above, an example is described in which the four-way control button 28B is the operation unit, but this is not limiting. Another button, touch sensor or the like may be employed.

In the exemplary embodiment described above, an example is described in which the head-up display 28A is the display unit, but this is not limiting. For example, an alternative display such as a display or suchlike provided at an instrument panel or the like may be employed.

In the exemplary embodiment described above, an example is described in which the autonomous driving control ECU 26 is capable of autonomous driving that is independent running with monitoring of vicinity conditions, but the autonomous driving is not limited thus. For example, driving assistance may be employed that runs at a specified speed during running on a high-speed road and, when a preceding vehicle is detected, follows or overtakes the preceding vehicle. That is, provided the autonomous driving is capable of controlling at least a portion of driving operations and of an overtaking maneuver to overtake a vehicle in front, autonomous driving is not limiting to the autonomous driving described above.

In the exemplary embodiment described above, an example is described in which the overtaking instruction operation is performed by the up button of the four-way control button 28B being operated in a state in which there is another vehicle in front, but this is not limiting. For example, the overtaking instruction operation may be performed by the down button of the four-way control button 28B being operated in a state in which there is another vehicle in front. Alternatively, operation of the right button or left button of the four-way control button 28B may be used instead of operation of the up button.

The processing illustrated in FIG. 4 that is executed by the autonomous driving control ECU 26 of the exemplary embodiment described above is described as being software processing that is implemented by a program being executed, but the processing may be implemented in hardware. Alternatively, the processing may combine both software and hardware. Further, the program memorized in the ROM may be memorized in any of various storage media and distributed.

The present disclosure is not limited by the above recitations. In addition to the above recitations, it will be clear that numerous modifications may be embodied within a technical scope not departing from the gist of the disclosure.

What is claimed is:

1. A driving assistance device for a vehicle, comprising:
a detection unit that detects a vicinity condition of the vehicle and a running condition of the vehicle;
a driving control unit that, on the basis of detection results from the detection unit, controls at least a portion of driving operations of the vehicle and controls autonomous driving that is configured to perform an overtaking maneuver to overtake a vehicle in front;
an operation unit that implements an operation to change a specified speed during the autonomous driving; and
a control unit that, after the operation to change the specified speed is implemented by the operation unit in a state during autonomous driving in which a vehicle in front is detected by the detection unit, controls the driving control unit so as to carry out the overtaking maneuver.

2. The driving assistance device for a vehicle according to claim 1, further comprising a display unit that displays an overtaking display and a speed change display in a same screen, as information relating to operations of the operation unit.

3. The driving assistance device for a vehicle according to claim 1, wherein the operation to change the specified speed is an operation to raise the specified speed.

4. The driving assistance device for a vehicle according to claim 1, wherein the control unit controls the driving control unit to perform the overtaking maneuver in response to the operation implemented by the operation unit.

5. The driving assistance device for a vehicle according to claim 1, wherein the operation implemented by the operation unit is a manual operation.

6. The driving assistance device for a vehicle according to claim 1, further comprising a display unit that, before the overtaking maneuver is performed, displays information indicating that an overtaking instruction has been given.

7. The driving assistance device for a vehicle according to claim 6, wherein,
after the operation to change the specified speed is implemented by the operation unit in a state during autonomous driving in which a vehicle in front is detected by the detection unit, before the overtaking maneuver is performed:
the display unit displays an overtaking instruction screen in a flashing state before confirmation, and
the control unit makes a determination as to whether the overtaking instruction has been confirmed, and when the overtaking instruction has been confirmed by the operation unit being operated, the display unit displays the overtaking instruction screen in a non-flashing state.

8. The driving assistance device for a vehicle according to claim 1, wherein, after a state in which overtaking cannot be performed is detected by the detection unit, the driving control unit controls the autonomous driving so as to wait until overtaking can be performed.

9. The driving assistance device for a vehicle according to claim 8, wherein, while waiting until overtaking can be performed, the display unit displays an overtaking preparation display.

* * * * *